United States Patent [19]

Meyerle

[11] 4,259,881

[45] Apr. 7, 1981

[54] HYDROMECHANICAL LOAD-SPLITTING DRIVE

[75] Inventor: Michael Meyerle, Meckenbeuren-Lochbrücke, Fed. Rep. of Germany

[73] Assignee: Zahnradfabrik Friedrichshafen AG, Friedrichshafen, Fed. Rep. of Germany

[21] Appl. No.: 969,948

[22] Filed: Dec. 15, 1978

[30] Foreign Application Priority Data

Dec. 29, 1977 [DE] Fed. Rep. of Germany ....... 2758660

[51] Int. Cl.[3] .............................................. F16H 47/04
[52] U.S. Cl. ..................................................... 74/687
[58] Field of Search ................. 74/674, 677, 687, 718, 74/720, 720.5, 731

[56] References Cited

U.S. PATENT DOCUMENTS

| | | | |
|---|---|---|---|
| 3,180,180 | 4/1965 | Helfer et al. | 74/677 |
| 3,396,607 | 8/1968 | Ross | 74/687 |
| 3,603,176 | 9/1971 | Tipping | 74/687 |
| 3,665,787 | 5/1972 | Wilkinson | 74/674 |
| 3,665,788 | 5/1972 | Nyman | 74/687 |
| 3,748,924 | 7/1973 | Cross et al. | 74/677 |
| 3,851,544 | 12/1974 | Herman | 74/677 |
| 3,903,756 | 9/1975 | Hamma | 74/720 |

*Primary Examiner*—Peter M. Caun
*Attorney, Agent, or Firm*—Karl F. Ross

[57] ABSTRACT

A hydromechanical drive comprises an input shaft connected to the input side of a hydrostatic transmission having an output side and comprising a pair of hydraulically interconnected hydraulic machines one of which is of variable volume to vary the transmission ratios between its input and output sides. A cam-type summing transmission has one input element connected to the output side of the hydrostatic transmission, another input element connected to the input shaft of the drive, and an output element connected to the output shaft of the drive. A brake is connected to the output side of the hydrostatic transmission for retarding same and thereby reducing the load on the hydrostatic transmission. This brake may be of the torque-converter type that applies increasing resistance to rotation as rotation speed increases.

9 Claims, 2 Drawing Figures

HYDROMECHANICAL LOAD-SPLITTING DRIVE

FIELD OF THE INVENTION

The present invention relates to a hydromechanical load-splitting drive. More particularly this invention concerns a hydromechanical load-splitting transmission capable of giving a steplessly variable output speed with a fixed input speed.

BACKGROUND OF THE INVENTION

Hydromechanical load-splitting transmissions are known, as for example from my commonly owned U.S. patent application 967,006 filed Dec. 6, 1978 and from commonly owned patent application 896,501 filed Apr. 17, 1978. In these arrangements the force applied to the input shaft of the drive is split up and passed in part through a mechanical transmission, and in part through a hydrostatic transmission. The mechanical transmission may have several gear ranges. The hydrostatic transmission normally has a variable-volume pump that is driven by the input shaft of the drive and a fixed-volume motor that in turn is connected to an input element of a summing transmission having another input element connected either through a gear box or directly to the input shaft of the drive.

Such a drive is capable of producing a relatively high output torque and speed, using hydrostatic elements which are of substantially smaller capacity than would be necessary to produce this output torque and speed all alone. Thus the main advantage of hydrostatic elements, namely the stepless variation in speed is obtained without the high cost normally associated with such arrangements.

Other devices are known, as for example from Austrian Pat. No. 265,796 of Oct. 25, 1968, which produce a steplessly variable output speed using a fixed-speed electric motor at the input. Here the use of hydrostatic elements once again makes it possible to achieve this stepless variation in output speed while at the same time producing a drive of relatively low cost.

All of these systems have the considerable disadvantage, however, that it is impossible to achieve a relatively high output speed with them, even at low torque. The hydrostatic elements are not capable of turning at the high speed necessary to produce a high-speed output, even though it is a relatively simple job to use gearing in the mechanical leg of the force-transmission path which is capable of producing such speeds. A high output speed is useful, for example, in a crane when lifting an unloaded grab to the upper part of the boom or in a piece of construction equipment that must travel at relatively high speed along the highway.

OBJECTS OF THE INVENTION

It is therefore an object of the present invention to provide an improved load-splitting drive.

A further object is to provide such a drive which is capable of producing a high output speed, even while using hydraulic elements of a relatively small capacity and low maximum speed.

Yet another object is to provide such a system wherein the output torque will automatically increase if the output shaft of the drive is slowed down excessively.

SUMMARY OF THE INVENTION

These objects are attained according to the instant invention in a load-splitting drive of the above-described general type, but wherein a brake is provided which can retard the output side of the hydrostatic transmission. Thus it is possible to avoid overloading the hydrostatic transmission by actively slowing it, so that most of the force will be transmitted through the mechanical leg of the drive by means of the gear-type transmission.

According to this invention this arrangement can be a simple mechanical brake, or in accordance with another feature of this invention may be a hydrostatic brake formed as a torque convertor whose one side is fixed and whose other side is carried by the output side of the hydrostatic transmission. Thus as the output speed of the transmission increases the braking force applied to this output side will increase, thereby automatically holding down the speed of the hydrostatic transmission and forcing the gear-type transmission parallel to it to carry most of the load. In this manner it is possible to achieve a relatively high-speed operation at relatively low torque even when using hydraulic elements of small size and low cost.

Furthermore if such a drive is operating at high speed and the output shaft is loaded excessively so as to slow it down, the braking on the output side of the hydrostatic transmission would decrease so that more force would be transmitted through it to the output shaft and, therefore, the torque applied to the output shaft will increase. What is more the use of a hydrostatic brake of the type described above ensures that very little energy is needed to start the drive going, so that jumpy starts often encountered in prior-art systems are avoided.

SPECIFIC DESCRIPTION

Figure 1:
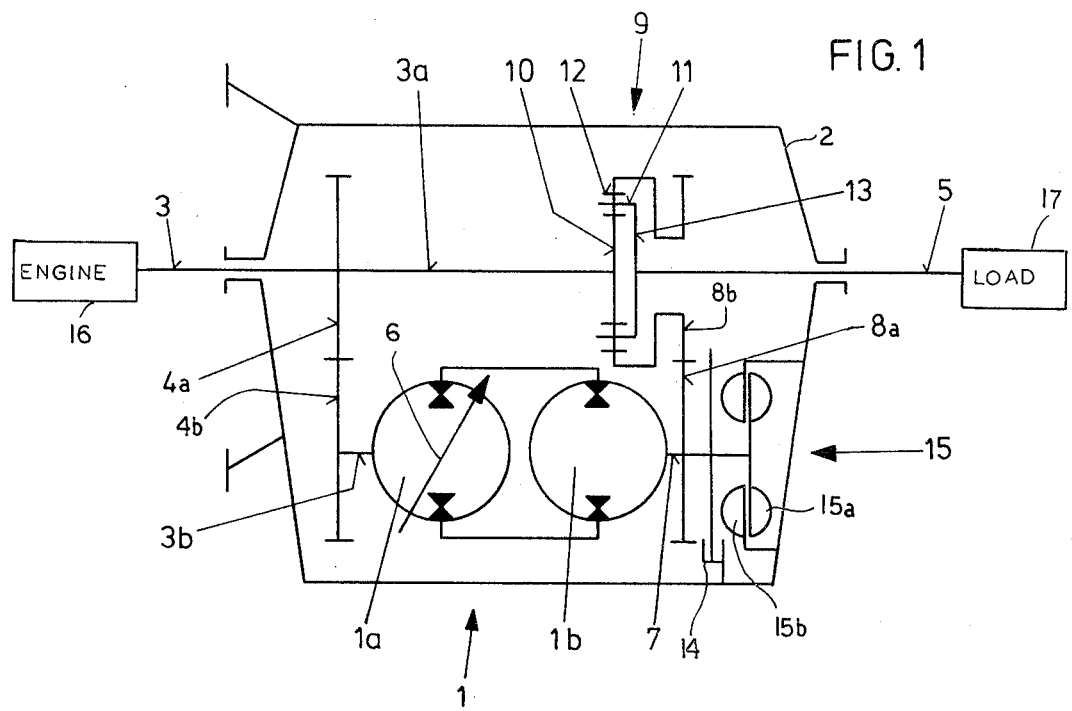
FIG. 1 is a schematic view of the system according to the instant invention.

As shown in FIG. 1 a drive according to this invention has a housing 2 with an input shaft 3 connected to an engine 16 and an output shaft 5 connected with a load 17. The input shaft 3 carries an input drive gear 3a meshing with a gear 4b carried on the input shaft 3b of a hydrostatic transmission 1. This transmission 1 has a hydrostatic variable-volume pump 1a with a control element 6 and a fixed-volume motor 1b with an output shaft 7.

A mechanical brake 14 can act on the output shaft 7 to retard it. In addition the output shaft 7 carries a rotor 15a of a hydrostatic brke 15 having a stator 15b fixed to the housing 2. Thus, when the brake 14 is not actuated, the brake 15 will resist rotation of the shaft 7 with a force increasing with the shaft rotation speed.

The input shaft 3 is extended as a shaft 3a connected to the sun gear 10 of a planetary-gear transmission 9 having planet gears 11 mounted on a planet carrier 13 fixed to the output shaft 5. This transmission 9 also has a ring gear 12 connected to another gear 8b meshing with a gear 8a carried on the output shaft 7.

Figure 2:
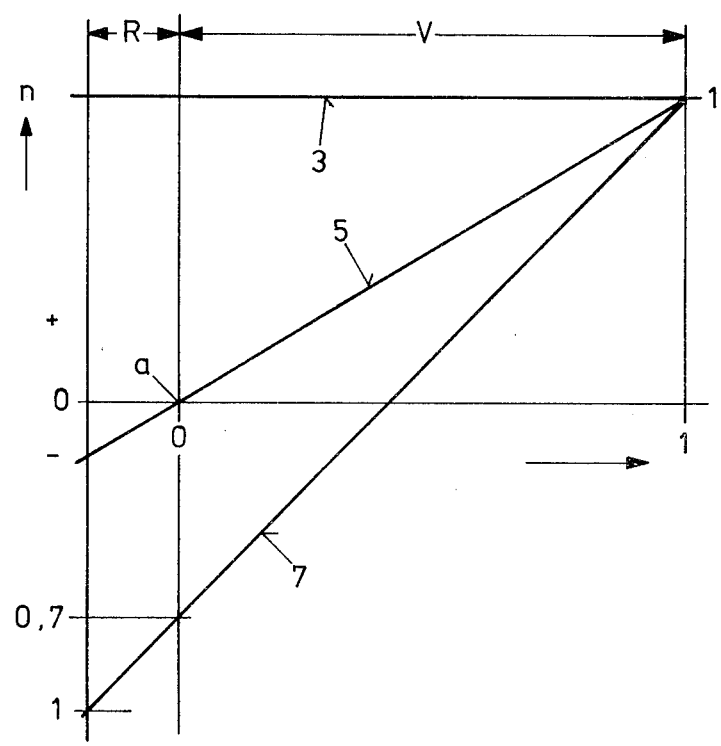
FIG. 2 is a diagram illustrating operation of the drive of FIG. 1.

As shown in FIG. 2 the input shaft 3 is normally rotated at a constant speed. The gear ratios within the transmission 9 are such that to achieve a zero output speed or standstill of the output shaft 5 as shown at point a it is necessary for the control element 6 of the pump to be most of the way back so that the output shaft 7 of the motor is rotating in the negative direction or backwardly at seven-tenths of its maximum speed. This will drive the ring gear 12 in one direction while the sun gear 10 is moving in the exact opposite direction, so that the gears 11 will merely rotate on the planet carrier 13, but will not orbit. Slowing of the speed of the motor 1a and then increasing it from a standstill in a positive direction to its maximum speed will correspondingly increase the output speed of the shaft 5 from a standstill to maximum speed. Similarly increasing the backward speed of the output shaft 7 from 0.7 to maximum will cause the shaft 5 to rotate backwardly in a reverse range R.

In the forward gear V of the drive the brake 15 is effective to apply retarding force on the shaft 7 that increases with the speed of this shaft. The effect of this slowing or braking is to cause the proportion of load split between the two legs of the transmission to change, with more of the load passing through the mechanical leg formed by the gear-type transmission 9. Thus the output shaft 5 can be rotated at a much higher speed than would be possible if it were also driven by the transmission 1. It is of course possible for the braking to be made proportional to the pressure in the lines between the pump 1a and the motor 1b, proportional to ground speed, and/or proportional simply by adhering to the rotation speed of the shaft 7.

It is also possible to operate the pump 1a at maximum reverse speed to achieve a standstill of the shaft 5. In this arrangement it will therefore be necessary to provide for gearing to obtain reverse rotation of the shaft 5.

I claim:

1. A hydromechanical drive comprising:
   an input shaft;
   an output shaft;
   a hydrostatic transmission having an input side connected to said input shaft and an output side and comprising a pair of hydraulically interconnected hydraulic machines one of which is of variable volume to vary the transmission ratio between said input and output sides;
   a gear-type summing transmission having one input element connected to said output side of said hydrostatic transmission, another input element connected to said input shaft, and an output element connected to said output shaft; and
   means including a hydrostatic brake connected to said output side of said hydrostatic transmission for retarding said output side with a force generally proportional to the rotation speed thereof and thereby proportionally reducing the load on said hydrostatic transmission as the rotation speed of said output shaft increases.

2. The drive defined in claim 1, further comprising a mechanical friction-type brake connected in parallel to said hydrostatic brake.

3. The drive defined in claim 1 wherein said brake is fluid operated.

4. The drive defined in claim 3 wherein said hydrostatic brake includes a rotor connected to said output side of said transmission and a stator, said stator and rotor together forming a torque-converter type of brake.

5. The drive defined in claim 1 wherein said one hydraulic machine is a variable-volume pump and the other machine is a motor connected thereto.

6. The drive defined in claim 1 wherein said summing transmission is of the planetary type and has a planet carrier constituting said output element, and sun and ring gears constituting said input elements.

7. A method of operating a hydromechanical drive having:
   an input shaft;
   an output shaft;
   a hydrostatic transmission having an input side connected to said input shaft and an output side and comprising a pair of hydraulically interconnected hydraulic machines one of which is of variable volume to vary the transmission ratio between said input and output sides; and
   a gear-type summing transmission having one input element connected to said output side of said hydrostatic transmission, another input element connected to said input shaft, and an output element connected to said output shaft;
   said method comprising the step of braking said output side of said hydrostatic transmission to retard same with a force increasing generally proportionally with displacement speed of said output side and to thereby proportionally increase with transmission output speed the proportion of load transmitted through said gear transmission.

8. The method defined in claim 7 wherein said hydrostatic transmission includes a variable-volume pump and a motor constituting said machines, said method further comprising the step of operating said motor at relatively high speed to drive said one input element in one direction while simultaneously directly driving said other input element with said input shaft in the opposite direction at such a rate that said output shaft does not rotate.

9. The method defined in claim 7 wherein said output side is braked by means of a torque converter having one side that cannot rotate and another side connected to said output side.

* * * * *